United States Patent
Chuang et al.

(10) Patent No.: US 6,448,709 B1
(45) Date of Patent: Sep. 10, 2002

(54) FIELD EMISSION DISPLAY PANEL HAVING DIODE STRUCTURE AND METHOD FOR FABRICATING

(75) Inventors: Feng-Yu Chuang; Wen-Chun Wang, both of Hsin-Chu (TW)

(73) Assignee: Industrial Technology Research Institute, Chutung (TW)

( * ) Notice: Subject to any disclaimer, the term of this patent is extended or adjusted under 35 U.S.C. 154(b) by 0 days.

(21) Appl. No.: 09/396,536

(22) Filed: Sep. 15, 1999

(51) Int. Cl.$^7$ .................................................. H01J 1/30
(52) U.S. Cl. ...................... 313/497; 313/496; 313/311; 313/309; 313/336; 313/351
(58) Field of Search .......................... 313/496–497, 313/495, 309, 336, 351, 311

(56) References Cited

U.S. PATENT DOCUMENTS 6,057,637 A  *  5/2000  Zettl et al. .................... 313/310
6,239,547 B1 *  5/2001  Uemura et al. ......... 313/309 X

* cited by examiner

*Primary Examiner*—Ashok Patel
(74) *Attorney, Agent, or Firm*—Tung & Associates

(57) ABSTRACT

The field emission display panel is constructed by a first glass plate that has a plurality of emitter stacks formed on a top surface, each of the emitter stacks is formed parallel to a transverse direction of the glass plate and includes a layer of electrically conductive material and a layer of nanotube emitter on top, the first glass plate further has a plurality of rib sections formed of an insulating material inbetween the plurality of emitter stacks to provide electrical insulation, a second glass plate that is positioned over and spaced-apart from the first glass plate wherein an inside surface of the second glass plate has coated thereon a layer of an electrically conductive material such as indium-tin-oxide on the inside surface, and a multiplicity of fluorescent powder coating strips formed on the ITO layer each for emitting a red, green or blue light when activated by electrons emitted from the plurality of emitter stacks. The field emission display panel is assembled together by a number of side panels that joins the peripheries of the first and the second glass plate together to form a vacuum-tight cavity therein. The nanotube emitters can be formed of nanometer dimensioned hollow tubes or fibers of carbon, diamond or diamond-like carbon material mixed with a binder.

12 Claims, 3 Drawing Sheets

FIELD EMISSION DISPLAY PANEL HAVING DIODE STRUCTURE AND METHOD FOR FABRICATING

FIELD OF THE INVENTION

The present invention generally relates to a field emission display (FED) device and a method for fabricating the device and more particularly, relates to a field emission display device with a diode structure and equipped with nanotube emitters as the electron emission source and a method for fabricating the device by a thick film printing technique.

BACKGROUND OF THE INVENTION

In recent years, flat panel display devices have been developed and widely used in electronic applications such as personal computers. One of the popularly used flat panel display device is an active matrix liquid crystal display which provides improved resolution. However, the liquid crystal display device has many inherent limitations that render it unsuitable for a number of applications. For instance, liquid crystal displays have numerous fabrication limitations including a slow deposition process for coating a glass panel with amorphous silicon, high manufacturing complexity and low yield for the fabrication process. Moreover, the liquid crystal display devices require a fluorescent backlight which draws high power while most of the light generated is wasted. A liquid crystal display image is also difficult to see under bright light conditions or at wide viewing angles which further limit its use in many applications.

Other flat panel display devices have been developed in recent years to replace the liquid crystal display panels. One of such devices is a field emission display device that overcomes some of the limitations of LCD and provides significant advantages over the traditional LCD devices. For instance, the field emission display devices have higher contrast ratio, larger viewing angle, higher maximum brightness, lower power consumption and a wider operating temperature range when compared to a conventional thin film transistor (TFT) liquid crystal display panel.

A most drastic difference between a FED and a LCD is that, unlike the LCD, FED produces its own light source utilizing colored phosphors. The FEDs do not require complicated, power-consuming backlights and filters and as a result, almost all the light generated by a FED is visible to the user. Furthermore, the FEDs do not require large arrays of thin film transistors, and thus, a major source of high cost and yield problems for active matrix LCDs is eliminated.

In a FED, electrons are emitted from a cathode and impinge on phosphors coated on the back of a transparent cover plate to produce an image. Such a cathodoluminescent process is known as one of the most efficient methods for generating light. Contrary to a conventional CRT device, each pixel or emission unit in a FED has its own electron source, i.e., typically an array of emitting microtips. A voltage difference existed between a cathode and a gate electrode which extracts electrons from the cathode and accelerates them toward the phosphor coating. The emission current, and thus the display brightness, is strongly dependent on the work function of the emitting material. To achieve the necessary efficiency of a FED, the cleanliness and uniformity of the emitter source material are very important.

In order for the electron to travel in a FED, most FEDs are evacuated to a low pressure such as $10^{-7}$ torr in order to provide a log mean free path for the emitted electrons and to prevent contamination and deterioration of the microtips. The resolution of the display can be improved by using a focus grid to collimate electrons drawn from the microtips.

In the early development for field emission cathodes, a metal microtip emitter of molybdenum was utilized. In such a device, a silicon wafer is first oxidized to produce a thick silicon oxide layer and then a metallic gate layer is deposited on top of the oxide. The metallic gate layer is then patterned to form gate openings, while subsequent etching of the silicon oxide underneath the openings undercuts the gate and creates a well. A sacrificial material layer such as nickel is deposited to prevent deposition of nickel into the emitter well. Molybdenum is then deposited at normal incidence such that a cone with a sharp point grows inside the cavity until the opening closes thereabove. An emitter cone is left when the sacrificial layer of nickel is removed.

In an alternate design, silicon microtip emitters are produced by first conducting a thermal oxidation on silicon and then followed by patterning the oxide and selectively etching to form silicon tips. Further oxidation or etching protects the silicon and sharpens the point to provide a sacrificial layer. In another alternate design, the microtips are built onto a substrate of a desirable material such as glass, as an ideal substrate for large area flat panel displays. The microtips can be formed of conducting materials such as metals or doped semi-conducting materials. In this alternate design for a FED device, an interlayer that has controlled conductivity deposited between the cathode and the microtips is highly desirable. A proper resistivity of the interlayer enables the device to operate in a stable condition. In fabricating such FED devices, it is therefore desirable to deposit an amorphous silicon film which has electrical conductivity in an intermediate range between that of intrinsic amorphous silicon and $n^+$ doped amorphous silicon. The conductivity of the $n^+$ doped amorphous silicon can be controlled by adjusting the amount of phosphorous atoms contained in the film.

Generally, in the fabrication of a FED device, the device is contained in a cavity of very low pressure such that the emission of electrons is not impeded. For instance, a low pressure of $10^{-7}$ torr is normally required. In order to prevent the collapse of two relatively large glass panels which form the FED device, spacers must be used to support and provide proper spacing between the two panels. For instance, in conventional FED devices, glass spheres or glass crosses have been used for maintaining such spacings in FED devices. Elongated spacers have also been used for such purpose.

Referring initially to FIG. 1A wherein an enlarged, cross-sectional view of a conventional field emission display device 10 is shown. The FED device 10 is formed by depositing a resistive layer 12 of typically an amorphous silicon base film on a glass substrate 14. An insulating layer 16 of a dielectric material and a metallic gate layer 18 are then deposited and formed together to provide metallic microtips 20 and a cathode structure 22 is covered by the resistive layer 12 and thus, a resistive but somewhat conductive amorphous silicon layer 12 underlies a highly insulating layer 16 which is formed of a dielectric material such as $SiO_2$. It is important to be able to control the resistivity of the amorphous silicon layer 12 such that it is not overly resistive but yet, it will act as a limiting resistor to prevent excessive current flow if one of the microtips 20 shorts to the metal layer 18.

A completed FED structure 30 including anode 28 mounted on top of the structure 30 is shown in FIG. 1B. It is to be noted, for simplicity reasons, the cathode layer 22 and the resistive layer 12 are shown as a single layer 22 for the cathode. The microtips 20 are formed to emit electrons 26 from the tips of the microtips 20. The gate electrodes 18 are provided with a positive charge, while the anode 28 is provided with a higher positive charge. The anode 28 is formed by a glass plate 36 which is coated with phosphorous particles 32. An intermittent conductive layer of indium-tin-oxide (ITO) layer 34 may also be utilized to further improve the brightness of the phosphorous layer when bombarded by electrons 26. This is shown in a partial, enlarged cross-sectional view of FIG. 1C. The total thickness of the FED device is only about 2 mm, with vacuum pulled inbetween the lower glass plate 14 and the upper glass plate 36 sealed by sidewall panels 38 (shown in FIG. 1B).

The conventional FED devices formed by microtips shown in FIGS. 1A–1C produce a flat panel display device of improved quality when compared to liquid crystal display devices. However, a major disadvantage of the microtip FED device is the complicated processing steps that must be used to fabricate the device. For instance, the formation of the various layers in the device, and specifically the formation of the microtips, requires a thin film deposition technique utilizing a photolithographic method. As a result, numerous photomasking steps must be performed in order to define and fabricate the various structural features in the FED. The CVD deposition processes and the photolithographic processes involved greatly increase the manufacturing cost of a FED device.

In a copending application, Attorney's Docket No. 64,600-050, assigned to the common assignee of the present invention, a field emission display device and a method for fabricating such device of a triode structure using nanotube emitters as the electron emission sources were disclosed. In the triode structure FED device, the device is constructed by a first electrically insulating plate, a cathode formed on the first electrically insulating plate by a material that includes metal, a layer formed on the cathode of a high electrical resistivity material, a layer of nanotube emitter formed on the resistivity layer of a material of carbon, diamond or diamond-like carbon wherein the cathode, the resistivity layer and the nanotube emitter layer form an emitter stack insulated by an insulating rib section from adjacent emitter stacks, a dielectric material layer perpendicularly overlying a multiplicity of the emitter stacks, a gate electrode on top of the dielectric material layer, and an anode formed on a second electrically insulating plate overlying the gate electrode. The FED device proposed can be fabricated advantageously by a thick film printing technique at substantially lower fabrication cost and higher fabrication efficiency than the FEDs utilizing microtips. However, three separate electrodes are still required for the device, i.e., a cathode, a gate electrode and an anode. It is therefore desirable to design a new FED device that has a simplified structure without the need for three separate electrodes in order to function.

It is therefore an object of the present invention to provide a FED device that can be fabricated by a thick film printing technique that does not have the drawbacks or shortcomings of a conventional FED device.

It is another object of the present invention to provide a FED device that can be fabricated by a thick film printing technique in a simplified structure when compared to a triode structured FED device.

It is a further object of the present invention to provide a FED device that can be fabricated by a thick film printing technique without the need for thin film deposition and photolithographic processes.

It is another further object of the present invention to provide a FED device that can be fabricated by a screen printing technique at a substantially lower fabrication cost.

It is still another object of the present invention to provide a FED device that utilizes a diode structure of a single cathode and a single anode.

It is yet another object of the present invention to provide a FED device that can be fabricated by a thick film printing technique for forming nanotube emitter layers from nanometer dimensioned hollow fibers made of a carbon, a diamond or a diamond-like carbon material.

It is still another further object of the present invention to provide a method for fabricating a FED device by a thick film printing technique in a diode structure in which a multiplicity of spaced-apart emitter stacks are formed by screen printing a nanotube emitter material on an electrically conductive silver paste layer.

It is yet another further object of the present invention to provide a method for fabricating a FED device utilizing a thick film printing technique to form a cathode layer, a nanotube emitter layer, insulating rib sections on a bottom insulating plate and a fluorescent powder coating layer on a top insulating plate.

SUMMARY OF THE INVENTION

In accordance with the present invention, a field emission display device that has a diode structure and a method for fabricating such device are disclosed.

In a preferred embodiment, a field emission display panel is provided which includes a first electrically insulating plate, a plurality of emitter stacks formed on the first electrically insulating plate, each of the emitter stacks is positioned parallel to a transverse direction of the first insulating plate and includes a layer of a first electrically conductive material and a layer of nanotube emitter on top, a plurality of rib sections formed of an insulating material inbetween the plurality of emitter stacks providing electrical insulation therebetween, a second electrically insulating plate positioned over and spaced-apart from the first electrically insulating plate that has an inside surface facing the first plate, a layer of a second electrically conductive material on the inside surface of the second insulating plate, a multiplicity of strips of flourescent powder coating on the second electrically conductive material each for emitting a red, green or blue light upon activation by electrons emitted from the plurality of emitter stacks, and a plurality of side panels joining peripheries of the first and the second electrically insulating plates together forming a vacuum-tight cavity therein.

In the field emission display panel, the second electrically insulating plate further includes a black matrix layer inbetween the multiplicity of strips of fluorescent powder coating. The black matrix layer may be formed of an electrically conductive material. The first and the second electrically insulating plates are formed of a ceramic material that is substantially transparent. The layer of the first electrically conductive material may be a cathode for the field emission display panel, the layer of the first electrically conductive material may be a silver paste.

In the field emission display panel, the layer of the second electrically conductive material may be an anode for the field emission display panel, and may be formed of indium-tin-oxide (ITO). The layer of nanotube emitter may be formed of a mixture of nanometer dimensioned hollow tubes (or fibers) and a binder material, or a mixture of nanotube dimensioned hollow fibers of carbon, diamond or diamond-like carbon and a polymeric based binder. Each of the multiplicity of strips of fluorescent powder coating emits a light of red, green or blue that is different than the light emitted by its immediate adjacent strips when activated by electrons from the plurality of emitter stacks. Each of the plurality of rib sections further includes a base portion that overlaps an end portion of an emitter stack for reducing edge emission and a top portion extending from the base portion for confining electrons emitted from the emitter stack.

The present invention is further directed to a method for fabricating a field emission display panel that has a diode structure by the operating steps of providing a first electrically insulating plate, forming a plurality of emitter stacks on the first electrically insulating plate by a thick film printing technique parallel to a transverse direction of the first plate, each of the emitter stacks includes a layer of a first electrically conductive material and a layer of nanotube emitter on top, forming a plurality of rib sections from an electrically insulating material inbetween the plurality of emitter stacks providing electrical insulation thereinbetween, providing a second electrically insulating plate, forming a layer of a second electrically conductive material on an inside surface of the second electrically insulating plate facing the first electrically insulating plate when the first and the second plates are assembled together, forming a multiplicity of strips of fluorescent powder coating on the layer of second electrically conductive material for emitting a red, green or blue light when activated by electrons, and joining the first and the second electrically insulating plates together by side panels forming a vacuum-tight cavity therein.

The method for fabricating a field emission display panel that has a diode structure may further include the step of providing the first and the second electrically insulating plates in substantially transparent glass plates. The method may further include the step of printing the layer of a first electrically conductive material in a silver paste. The method may further include the step of printing the layer of nanotube emitter from a mixture of a binder and nanotube dimensioned hollow fibers of carbon fibers, diamond fibers or diamond-like carbon fibers. The method may further include the step of connecting a negative charge to the first electrically conductive material under the plurality of emitter stacks and a positive charge to the layer of the second electrically conductive material. The layer of the second electrically conductive material may be indium-tin-oxide (ITO).

The method for fabricating a field emission display panel that has a diode structure may further include the step of coating a black matrix layer on the second electrically insulating plate inbetween the multiplicity of strips of fluorescent powder coating. The multiplicity of strips of fluorescent powder coating may be formed by a thick film printing technique. The multiplicity of strips of fluorescent powder coating may be formed such that each strip emits a red, green or blue light that is different than its immediate adjacent strips when activated by electrons from the plurality of emitter stacks. The method may further include the step of forming the plurality of rib sections such that each rib section overlaps an end portion of an emitter stack for reducing edge emission from the emitter stack. The method may further include the step of forming the plurality of rib sections such that a top portion of each rib section extends upwardly from a base portion for confining electrons emitted from the emitter stack. The method may further include the step of forming the multiplicity of strips of fluorescent powder coating by a material including phosphor.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1A:
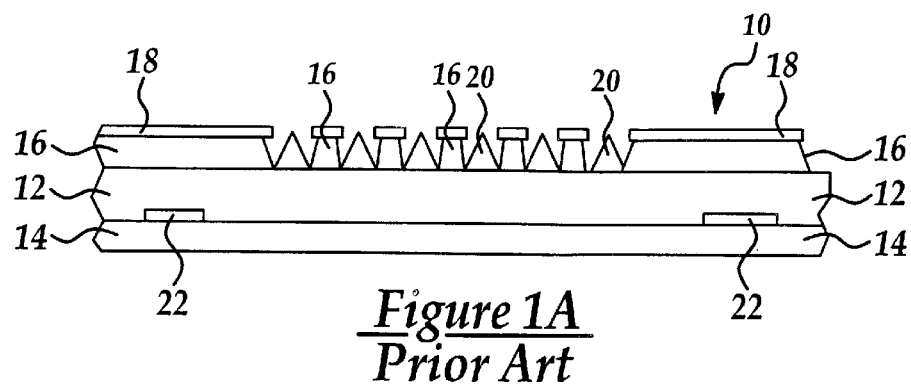
FIG. 1A is an enlarged, cross-sectional view of a conventional field emission display device utilizing microtips for electron emissions.
Figure 1B:
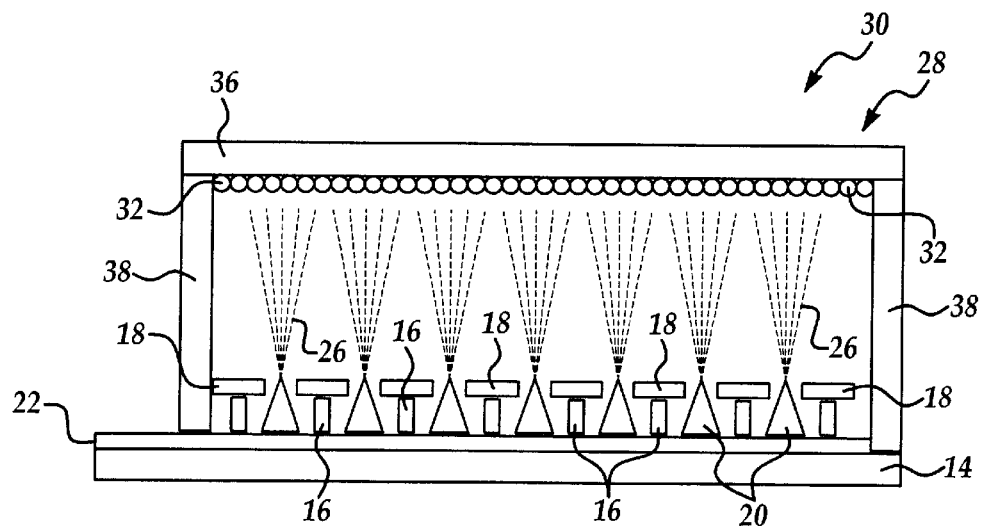
FIG. 1B is an enlarged, cross-sectional view of the conventional field emission display device of FIG. 1A further includes an anode and sidewall panels forming a sealed chamber.
Figure 1C:
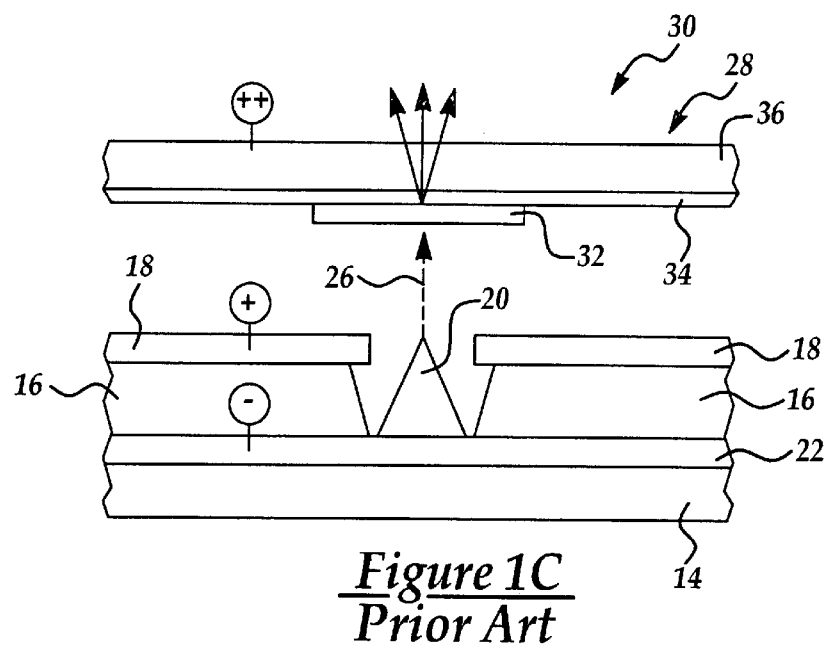
FIG. 1C is an enlarged, partial cross-sectional view of the conventional field emission display device of FIG. 1B illustrating the structure of a single microtip.

The present invention discloses a field emission display panel that has a diode structure and electron emitters formed by nanotube materials which can be fabricated by a low cost thick film printing including screen printing or ink-jet printing. The novel structure of a diode eliminates the need for a gate electrode that is normally required in a triode structure. The present invention novel field emission display panel is easier to construct and can be operated at low driving voltages resulting in higher operating efficiency.

In the field emission display panel of the present invention structure, a single cathode and a single anode are utilized in a diode structure. The single cathode may be advantageously formed of a silver paste or any other conductive paste material or film. The anode may be advantageously formed of an indium-tin-oxide layer on a top insulating plate, i.e., an optically transparent glass plate. The ITO material is substantially transparent and therefore does not affect the function of the display panel.

The diode structure is formed by first providing a transparent glass plate as the bottom insulating plate, then forming a plurality of emitter stacks on the glass plate by a thick film printing technique such as screen printing or ink-jet printing of a nanometer dimensioned hollow tubes or fibers such as carbon fiber, diamond fiber or diamond-like carbon fiber. Inbetween the plurality of emitter stacks, a plurality of rib sections are formed of an insulating material to provide electrical insulation between the emitter stacks. The rib sections may be formed of a base portion and a top portion, while the base portion may slightly overlap the end portions of a nanotube emitter stack such that edge emissions can be reduced. Edge emissions are frequently seen in conventional FED devices which are caused by reflection of electrons emitted from the emitter stacks resulting in reduced efficiency of the display panel.

On a top insulating plate, i.e., a second glass plate, a transparent electrode material such as indium-tin-oxide (ITO) is coated before a multiplicity of fluorescent powder coating strips are formed on the ITO layer, i.e., the anode layer. The multiplicity of strips of fluorescent powder coating emits red, green or blue light upon activation by the electrons emitted from the plurality of emitter stacks. Each of the fluorescent coating strip emits a light that is different in color than those emitted by its immediate adjacent coating strips. A plurality of side panels, i.e., four side panels may be used to join the peripheries of the first and the second glass plates together by utilizing a glass frit material to form a vacuum-tight cavity therein.

The electron emission source of the present invention novel diode structure field emission display panel is the thick film printed cathode layer of a nanotube emitter on top of a silver paste. The thick film printing technique utilized may be a screen printing technique or a ink-jet printing technique. The thick film printing method is most suitable for fabricating field emission display panels of large size such that the fabrication process can be carried out in an efficient manner. It has been found that, by utilizing the thick film printing technique, a printing resolution as high as 100 $\mu$m can be achieved. The present invention novel thick film printing method can therefore be suitably used for fabricating field emission display panels in a VGA format as large as 640×480 or larger.

Inbetween the nanotube emitter stacks, a plurality of rib sections may be formed by a screen printing method to provide electrical insulation between the emitter stacks. The rib sections are screen printed in the margin or the space between the emitter stacks. The rib sections may be printed to slightly overlap the ends of the emitter stacks such that edge emissions from the emitter stacks can be substantially reduced to reduce the scattering of electrons from the emitter stacks. This further improves the contrast of the field emission display panel.

On the anode formed of a transparent electrode material such as indium-tin-oxide, a multiplicity of fluorescent coating strips are formed by a thick film printing technique. The multiplicity of fluorescent coating strips are formed of a fluorescent powder material, such as phosphor, for emitting different light of red, green or blue in an alternating manner such that each strip emits a different colored light than its immediate adjacent strips. The multiplicity of strips may be separated into sections of small length in contact with the ITO layer and thus forming the anode. The multiplicity of fluorescent coating strips in short length can be arranged such that each group of three strips capable of emitting red, green and blue lights function as a single pixel element. This is important since each pixel element can be separately controlled to produce a color image on the field emission display panel by suitably controlling electron emissions from the nanotube emitter stacks to form multi-color images. Suitable fluorescent powder coatings which form red, green or blue light may be different grades of a phosphor coating.

A plurality of spacers are further formed by a screen printing technique inbetween the cathode nanotube emitters for providing insulation between the cathode and the anode. The spacers may be suitably formed as a top portion of the plurality of rib sections previously discussed to a suitable height, i.e., between about 10 $\mu$m and about 50 $\mu$m, similar to the rib sections normally used in plasma display panels. By the word "about", it is meant a value in a range of ±10% of the total value. The operating voltage for the cathode and the anode may be controlled based on the height of the plurality of spacers, or the height of the top portions of the rib sections. Generally, an operating field strength is between about 4 V/$\mu$m and about 6 V/$\mu$m. For instance, for an average operating field strength of 5 V/$\mu$m operating in panels that have rib sections of 10 $\mu$m~50 $\mu$m height, the operating voltage should be between about 50 V and about 250 V.

The fluorescent powder coating strips utilized on the anode layer may be suitably arranged in 90% angle to the cathode layer (i.e., the emitter stacks) on the bottom insulating plate. The anode and the cathode may then be scanned with an operating voltage at each pixel element to form a multi-color image.

Figure 2:
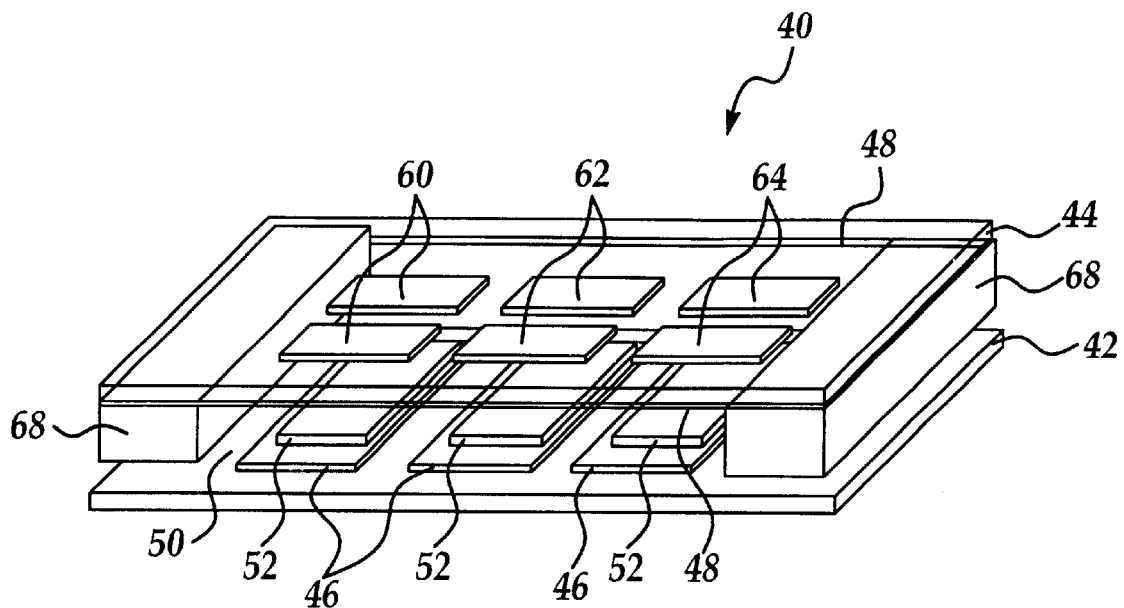
FIG. 2 is a perspective view of the present invention field emission display panel that has a diode structure.
Figure 3:
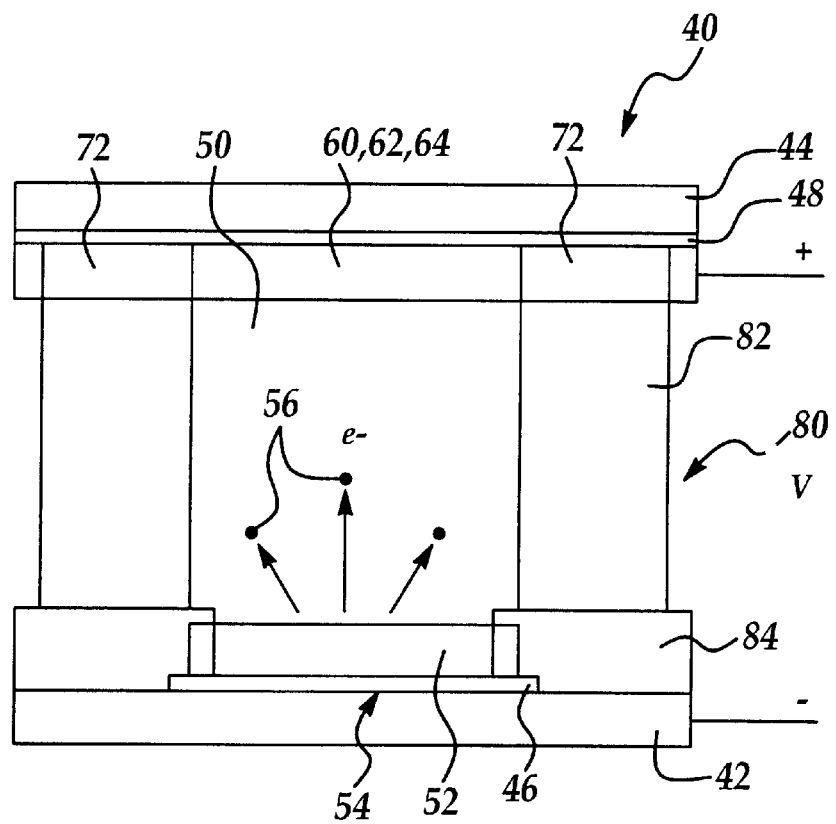
FIG. 3 is an enlarged, cross-sectional view of a single pixel of the present invention field emission display panel of FIG. 2.

Referring initially to FIG. 2 wherein a perspective view of the present invention field emission display panel 40 is shown. The field emission display panel 40 is constructed by a bottom insulating plate 42 and a top insulating plate 44. The insulating plates 42, 44 may be suitably formed of an optically transparent glass plate. On top of the bottom glass plate 42, is first formed a plurality of coating strips 46 of an electrically conductive material, such as a silver paste. Any other electrically conductive paste material formed by metallic particles mixed in a binder may also be used. The silver paste strips 46 are utilized as the cathode and are connected (not shown) to a negative charge. This is shown in FIG. 3 in a cross-sectional view. On an inside surface of the top insulating plate 44, is formed an electrically conductive layer 48 by a material such as indium-tin-oxide (ITO). The ITO layer 48 is used as the anode for carrying a positive charge and effecting an electric field in the cavity 50 formed between the top glass plate 44 and the bottom glass plate 42.

On top of the electrically conductive layer 46 of silver paste, is formed a nanotube emitter layer 52 which forms an emitter stack 54 together with the silver paste layer 46. The nanotube emitter layer 52 emits electrons 56 when charged by the silver paste layer 46 with a negative electric charge. The nanotube emitter layer 52 can be deposited by a thick film printing technique on top of the silver paste layer 46. The nanotube emitter layer 52 can be suitably formed of carbon nanotubes, diamond nanotubes or diamond-like carbon nanotubes that are fractured and mixed with a solvent-containing paste in a consistency that is suitable for thick film printing techniques, including screen printing and ink-jet printing. Any other suitable nanotube materials, as long as having a diameter that is between about 30 and about 50 nanometers may also be used. It should be noted that the nanotubes are hollow tubes formed in columnar shape and are normally smaller than the diameter of a fiber. A low operating voltage of between about 30 and about 50 volts is normally used to activate the nanotube emitter materials for emitting electrons. This operating voltage is significantly smaller than that normally required for operating microtips in a conventional FED device, i.e., in the range of larger than 100 volts.

Figure 4:
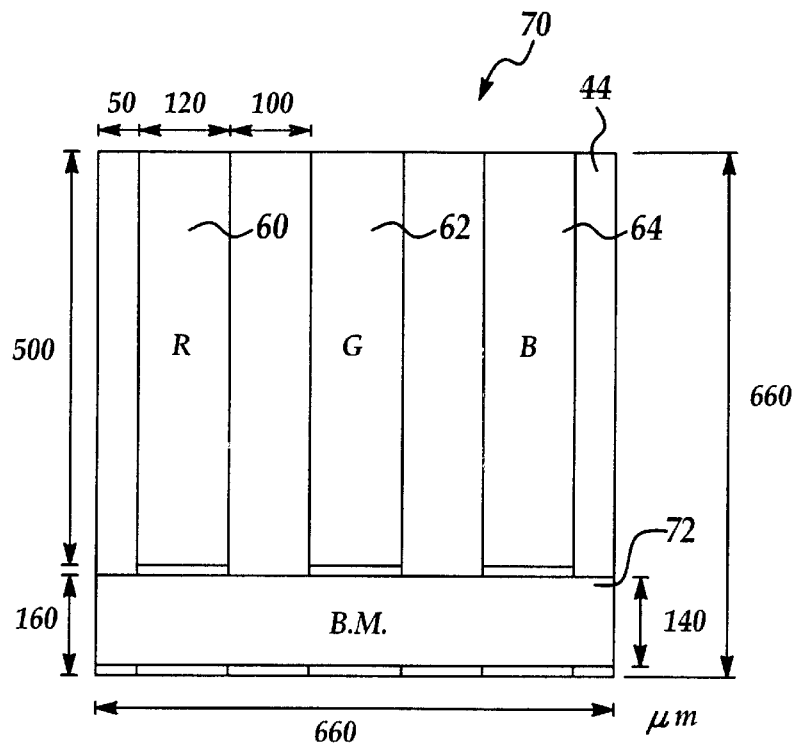
FIG. 4 is a plane view of a top insulating plate of the present invention field emission display panel coated with red, green and blue fluorescent coating strips.
Figure 5:
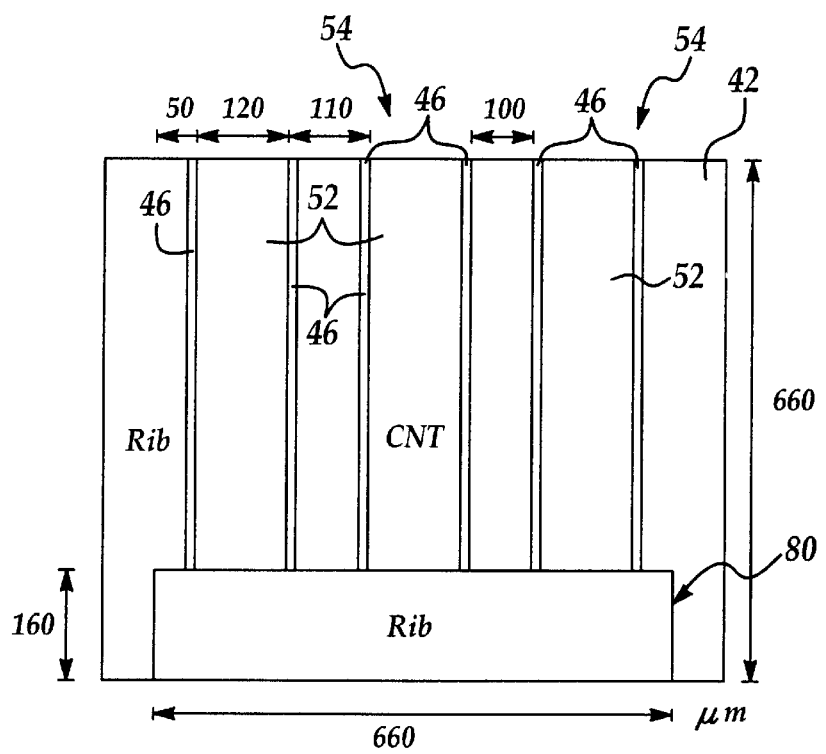
FIG. 5 is a plane view of a bottom insulating plate of the present invention field emission display panel coated with nanotube emitters.

After the nanotube emitter layer 52 is screen printed on the silver paste layer 46, the layer is hard baked to drive out residual solvents contained in the paste material and to cure the material. The nanotube emitter material frequently contains between about 20 wt % and about 80 wt % of nanotubes while the remainder is a solvent-containing binder. Preferably, the nanotube paste contains about 50 wt % nanotubes and about 50 wt % of the solvent-containing binder. After the hard baked step, tips or sharp points of the nanotubes protrude above the surface of the nanotube layer for use as electron emission sources and to enable the function of the present invention novel device. A multiplicity of the emitter stacks 54 can be formed on the bottom glass plate 42 in a transverse direction spaced-apart leaving a gap of about 110 μm thereinbetween. This is shown in FIG. 5 in a plane view for the bottom glass plate 42. Similarly, a plane view of the top glass plate 44 is shown in FIG. 4.

The carbon nanotube materials may be formed of hollow tubes which are either single-walled or multi-walled nanotubes. The nanotubes, after being fractured, may have a length between about 1 and about 3 μm. The nanotubes may have an outside diameter between about 5 and about 50 nanometers which relates to an aspect ratio of about 100, when the length is 1 μm and the diameter is 10 nm.

On an inside surface of the top glass plate 44, a layer of a transparent electrode material 48 is deposited for use as the anode. The transparent electrode 48 can be suitably a material such as indium-tin-oxide which does not affect the optical characteristics of the display panel. On top of the transparent electrode 48, is then deposited by a thick film printing technique a multiplicity of strips of fluorescent powder coating 60, 62 and 64. The fluorescent coating strips are arranged in such a way that each of the strips emits a color of red, green or blue which is different than the color emitted by its immediate adjacent strips. For instance, as shown in FIG. 2, the strips 60 emit red color, the strips 62 emit green color while the strips 64 emit blue color. For each group of the red, green and blue strips, a single pixel element is formed. This is shown in FIG. 4 in a plane view for single pixel element 70. The fluorescent powder coating can be suitably a phosphor powder wherein different grades of powders emits different red, green or blue color. Also shown in FIG. 2, are spacers 68 that are utilized for maintaining a suitable spacing between the top glass plate 44 and the bottom glass plate 42. The spacer 68 may be suitably formed of an insulating material by a screen printing technique or pre-fabricated and placed between the two glass plates.

Inbetween the phosphor coating strips 60, 62 and 64, a black matrix layer 72 may be formed for blocking out undesirable light and improving the contrast of the display panel. The black matrix material can be suitably a carbon loaded polymeric material that is applied by a screen printing technique. A plurality of rib sections 80 consisting of a top portion 82 and a base portion 84 is also shown in FIG. 3 in a cross-sectional view of a single pixel of the present invention display panel. The plurality of rib sections serves two main purposes. First, the base portion 84 of the rib section 80 slightly overlaps the nanotube emitter 52 at an end portion such that edge emissions of the nanotube emitter 52 can be significantly reduced. This further improves the contrast of the display panel by minimizing scattering of electrons 56 onto the rib sections 80. The top portion 82 of the rib section 80 serves the purpose of confining electrons 56 to its own supposed target 60, 62, 64 and thus further reducing the occurrence of scattering. It has been found that the height of the top portion 82 of the rib section 80 can be suitably adjusted depending on the operating voltage utilized. The higher the top portion 82, the higher the operating voltage for the display panel is required.

FIGS. 4 and 5 illustrate plane views of the present invention top glass plate 44 and bottom glass plate 42. A single pixel element 70 is shown in FIG. 4 with a fluorescent coating strip 60 for the red color, a fluorescent coating strip 62 for the green color and a fluorescent coating strip 64 for the blue color. A black matrix layer 72 is used to block off undesirable lights and for improving the contrast of the pixel element. The black matrix layer 72 is normally formed of an electrical conductive material such as a carbon loaded polymeric material so that electrons bombarded on the black matrix layer 72 can be readily dissipated without causing damage to the layer. Each of the pixel element 70 can be separately controlled by the nanotube emitters 52 coated on an electrically conductive layer 46 of silver paste material. Rib sections 80 are further utilized for insulating between the various nanotube stacks 54.

Suitable dimensions for the present invention pixel element 70 are shown in FIGS. 4 and 5. For instance, the strips of fluorescent powder coating have a width of approximately 120 μm and a length of about 500 μm. The black matrix layer has a width of about 140 μm and a length of about 660 μm. Each of the pixel element 70 has a dimension of approximately 660 μm×660 μm. The spacing between the strips of fluorescent powder coating 60, 62 and 64 is about 100 μm.

As shown in FIG. 5, the nanotube emitter has a width of about 120 μm and a length of about 500 μm. The spacing between the nanotube emitters is about 110 μm, while the spacing between the conductive coating layer, i.e., the silver paste layer 46 is about 100 μm. The dimension of the bottom glass plate 42 is similar to that for the top glass plate 44, i.e., of about 660 μm×660 μm.

The present invention novel field emission display panel that has the diode structure has therefore been amply described in the above descriptions and in the appended drawings of FIGS. 2–5.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A field emission display panel comprising:
    a first electrically insulating plate,
    a plurality of emitter stacks formed on said first electrically insulating plate, each of said emitter stacks being positioned parallel to a transverse direction of said first insulating plate and comprises a layer of a first electrically conductive material and a layer of nanotube emitter on top,
    a plurality of rib sections formed of an insulating material inbetween said plurality of emitter stacks providing electrical insulation thereinbetween,
    a second electrically insulating plate positioned over and spaced-apart from sad first electrically insulating plate having an inside surface facing said first plate,
    a layer of a second electrically conductive material on said inside surface of said second insulating plate,
    a multiplicity of strips of fluorescent powder coating on said second electrically conductive material each for emitting a red, green or blue light upon activation by electrons emitted from said plurality of emitter stacks, and
    a plurality of side panels joining peripheries of said first and second electrically insulating plates together forming a vacuum-tight cavity therein.

2. A field emission display panel according to claim 1, wherein said second electrically insulating plate further comprises a black matrix layer inbetween said multiplicity of strips of fluorescent powder coating.

3. A field emission display panel according to claim 2, wherein said black matrix layer being formed of an electrically conductive material.

4. A field emission display panel according to claim 1, wherein said first and second electrically insulating plates are formed of a ceramic material that is substantially transparent.

5. A field emission display panel according to claim 1, wherein said layer of a first electrically conductive material is a cathode for said field emission display panel.

6. A field emission display panel according to claim 1, wherein sad layer of a first electrically conductive material is a silver paste.

7. A field emission display panel according to claim 1, wherein said layer of second electrically conductive material is an anode for said field emission display panel.

8. A field emission display panel according to claim 1, wherein said layer of second electrically conductive material is for med of indium-tin-oxide (ITO).

9. A field emission display panel according to claim 1, wherein said layer of nanotube emitter being formed of a mixture of nanometer dimensioned hollow tubes and a binder material.

10. A field emission display panel according to claim 1, wherein said layer of nanotube emitter being formed of a mixture of nanometer dimensioned hollow tubes of a carbon, diamond or diamond-like carbon and a polymeric-based binder.

11. A field emission display panel according to claim 1, wherein each of said multiplicity of strips of fluorescent powder coating emits a light of red, green or blue that is different than the light emitted by its immediate adjacent strips when activated by electrons from said plurality of emitter stacks.

12. A field emission display panel according to claim 1, wherein each of said plurality of rib sections further comprises a base portion that overlays an end portion of an emitter stack for reducing edge emissions and a top portion extends from said base portion for confining electrons emitted from said emitter stack.

\* \* \* \* \*